(12) United States Patent
Han et al.

(10) Patent No.: US 7,269,315 B2
(45) Date of Patent: Sep. 11, 2007

(54) APPARATUS FOR WRITING BRAGG GRATINGS AND REFLECTION UNIT USED IN THE APPARATUS

(75) Inventors: Jun Mo Han, Gwangju (KR); Kie Gon Im, Gwangju (KR); Se Jong Baik, Gwangju (KR)

(73) Assignee: Chonnam National University, Gwangju (KR)

( * ) Notice: Subject to any disclaimer, the term of this patent is extended or adjusted under 35 U.S.C. 154(b) by 246 days.

(21) Appl. No.: 11/200,187

(22) Filed: Aug. 10, 2005

(65) Prior Publication Data

US 2006/0263006 A1    Nov. 23, 2006

(30) Foreign Application Priority Data

May 18, 2005    (KR)    ................... 10-2005-0041842

(51) Int. Cl.
  *G02B 6/34*    (2006.01)
  *G02B 5/18*    (2006.01)
  *G03F 1/00*    (2006.01)
  *H01L 21/00*    (2006.01)

(52) U.S. Cl. .................. 385/37; 430/4; 430/5; 438/29; 438/32; 359/566; 359/569

(58) Field of Classification Search ................. 385/10, 385/37, 31, 38, 129, 130; 430/4, 5; 438/29.32; 359/326, 327, 328, 329, 330, 331, 332, 566, 359/569, 572, 573

See application file for complete search history.

(56) References Cited

U.S. PATENT DOCUMENTS

| | | | | |
|---|---|---|---|---|
| 5,367,588 A | * | 11/1994 | Hill et al. | ........................ 430/5 |
| 5,768,454 A | * | 6/1998 | Chesnoy et al. | ............... 385/37 |
| 6,310,996 B1 | * | 10/2001 | Byron | ......................... 430/321 |
| 6,548,225 B1 | * | 4/2003 | Hammon et al. | ............ 430/321 |
| 6,701,044 B2 | * | 3/2004 | Arbore et al. | ................. 385/37 |
| 7,018,745 B2 | * | 3/2006 | Stepanov et al. | ............... 430/1 |
| 2006/0263006 A1 | * | 11/2006 | Han et al. | ...................... 385/37 |

* cited by examiner

*Primary Examiner*—Brian M. Healy

(74) *Attorney, Agent, or Firm*—Greenblum & Bernstein, P.L.C.

(57) ABSTRACT

Provided is an apparatus for writing Bragg gratings and a reflection unit used in the same capable of readily adjusting an incident angle of light radiated from a light source, in order to write Bragg gratings on a target object such as an optical fiber. In accordance with the present invention, it is possible to readily adjust the incident angle of light introduced into the target object using the reflection unit when the position of the target object changes or an interval between the Bragg gratings is adjusted.

11 Claims, 12 Drawing Sheets

(FIG 1)
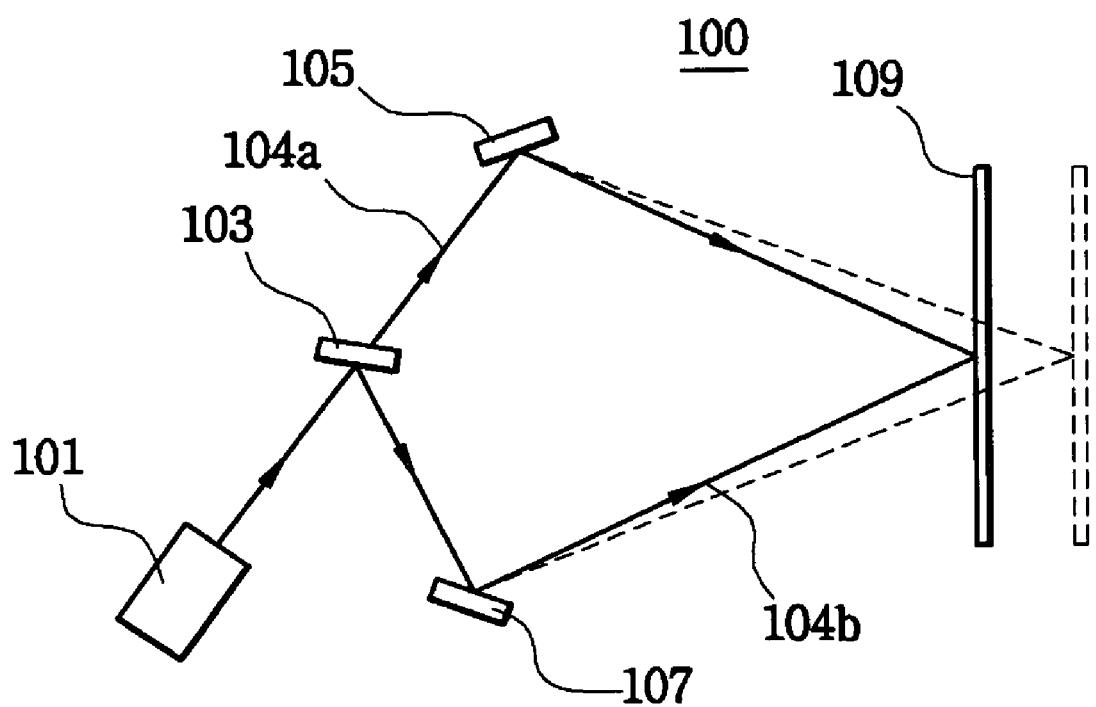

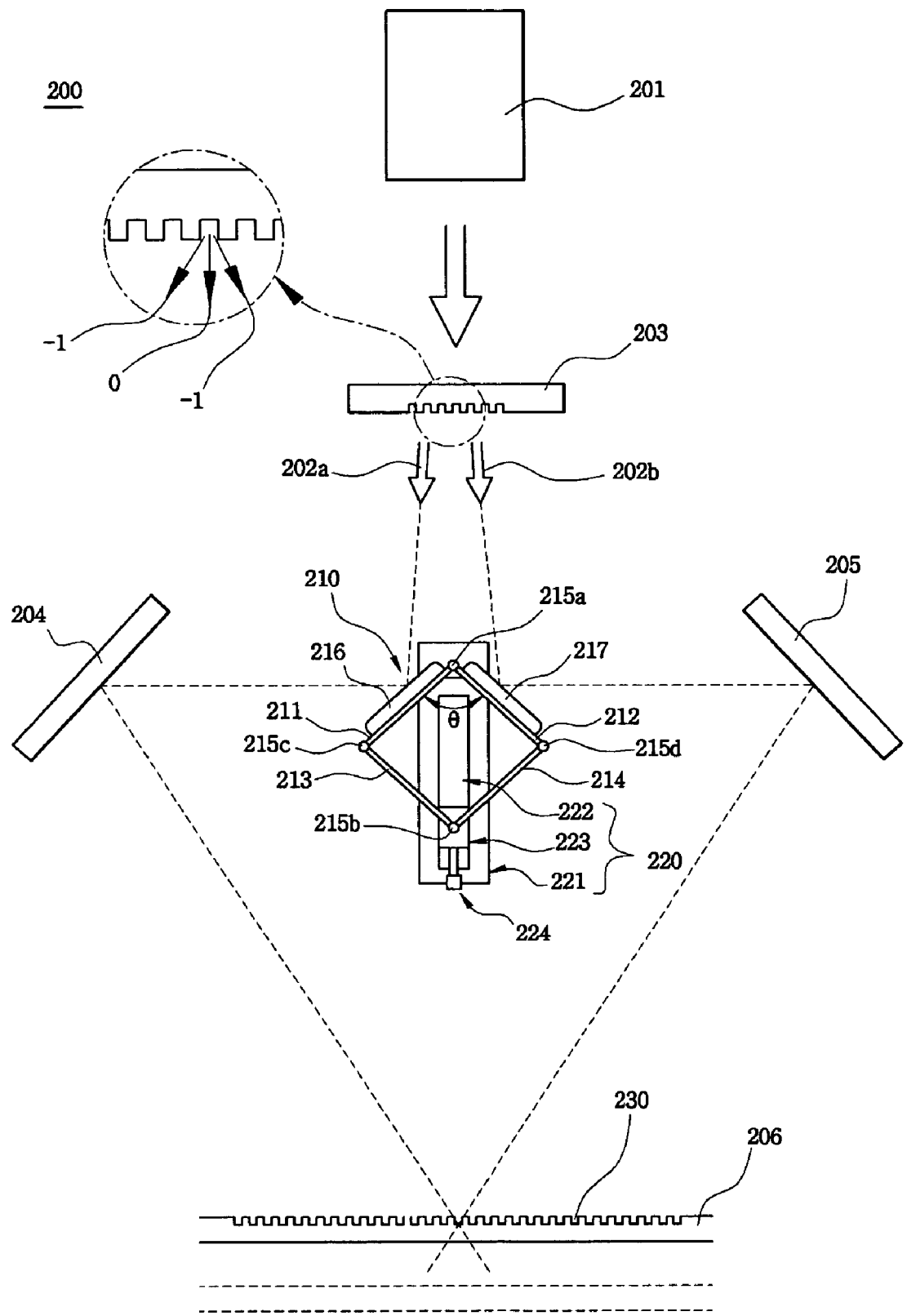

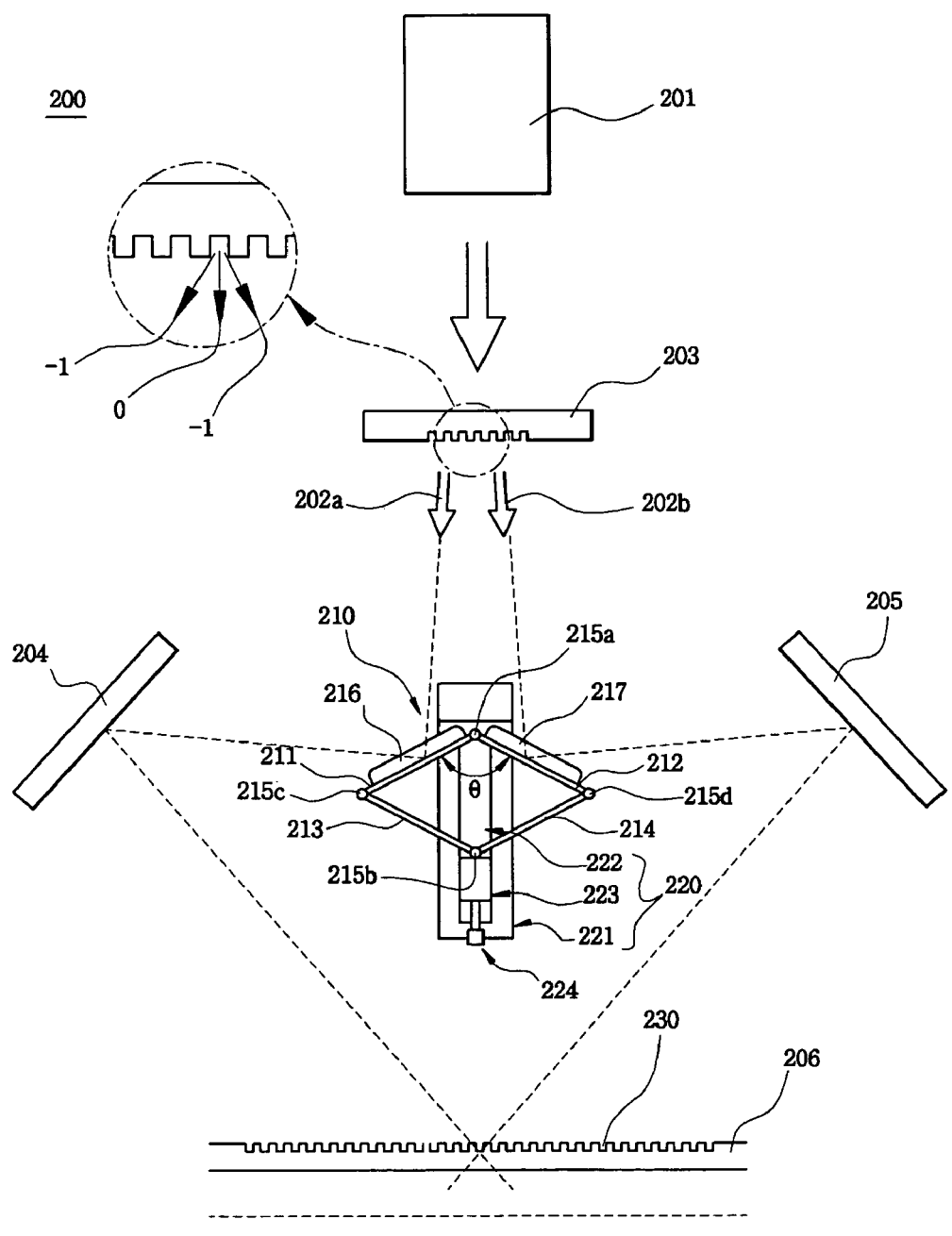

(FIG 3b)
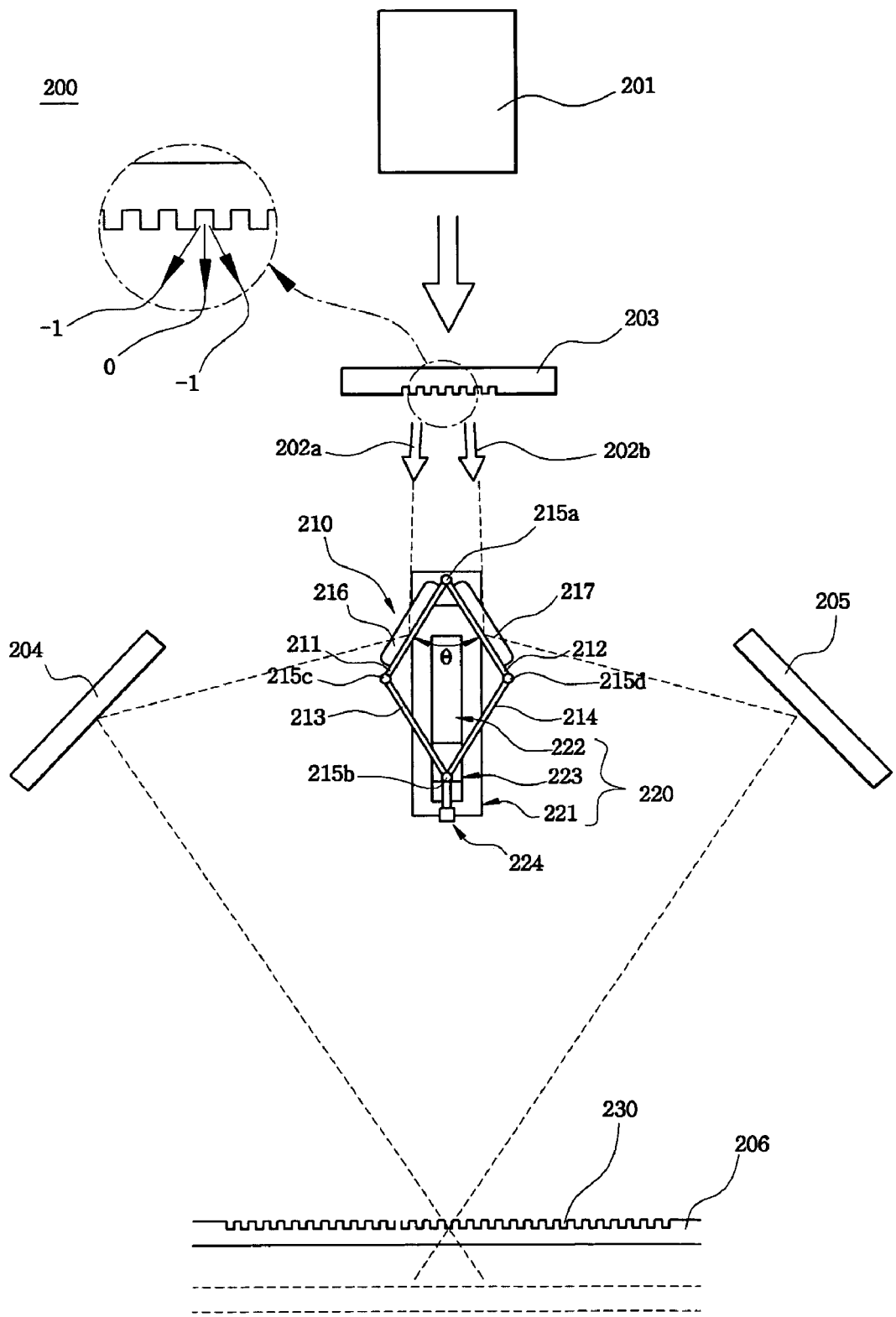

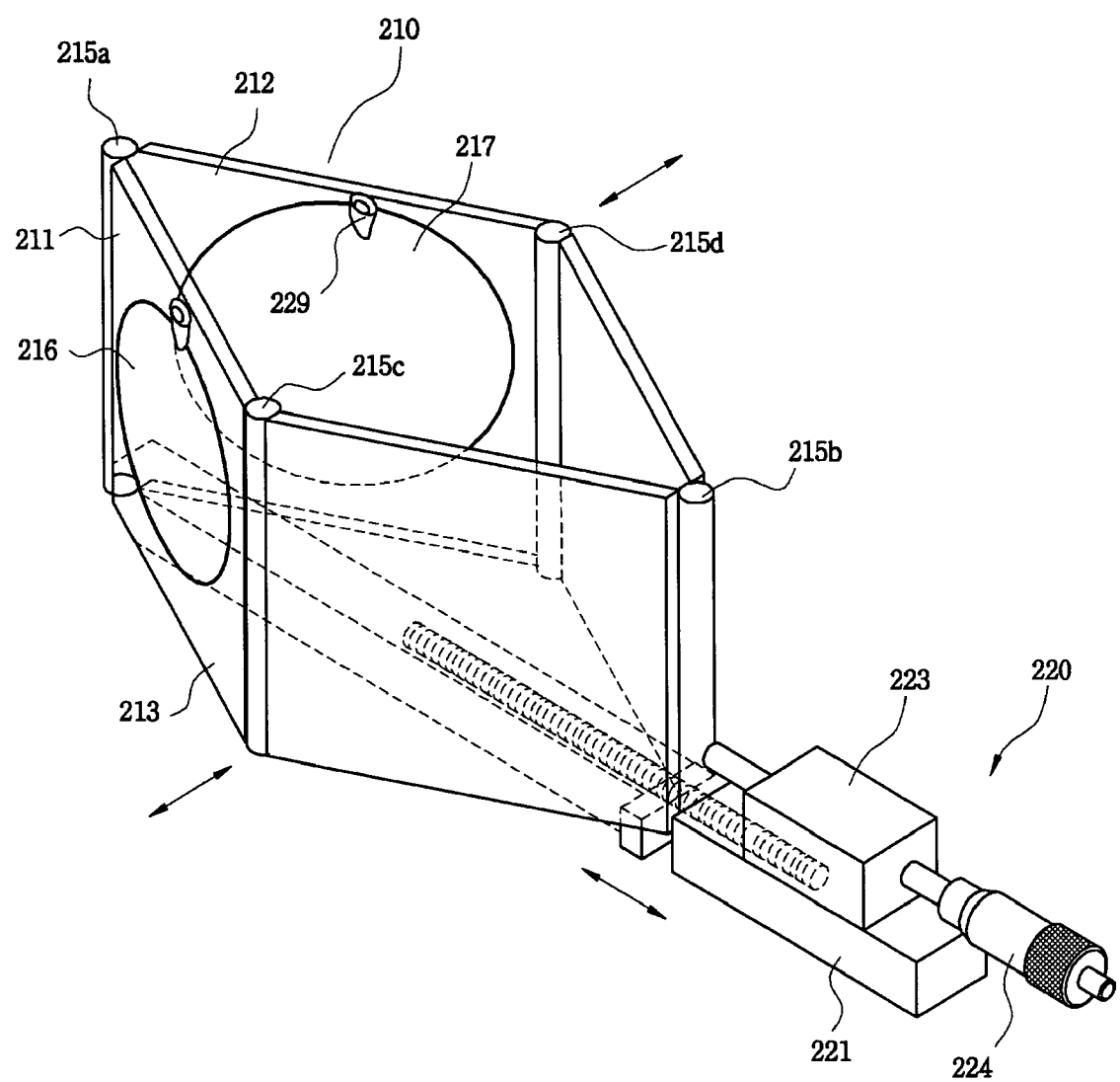
(FIG 4)

(FIG 5a)
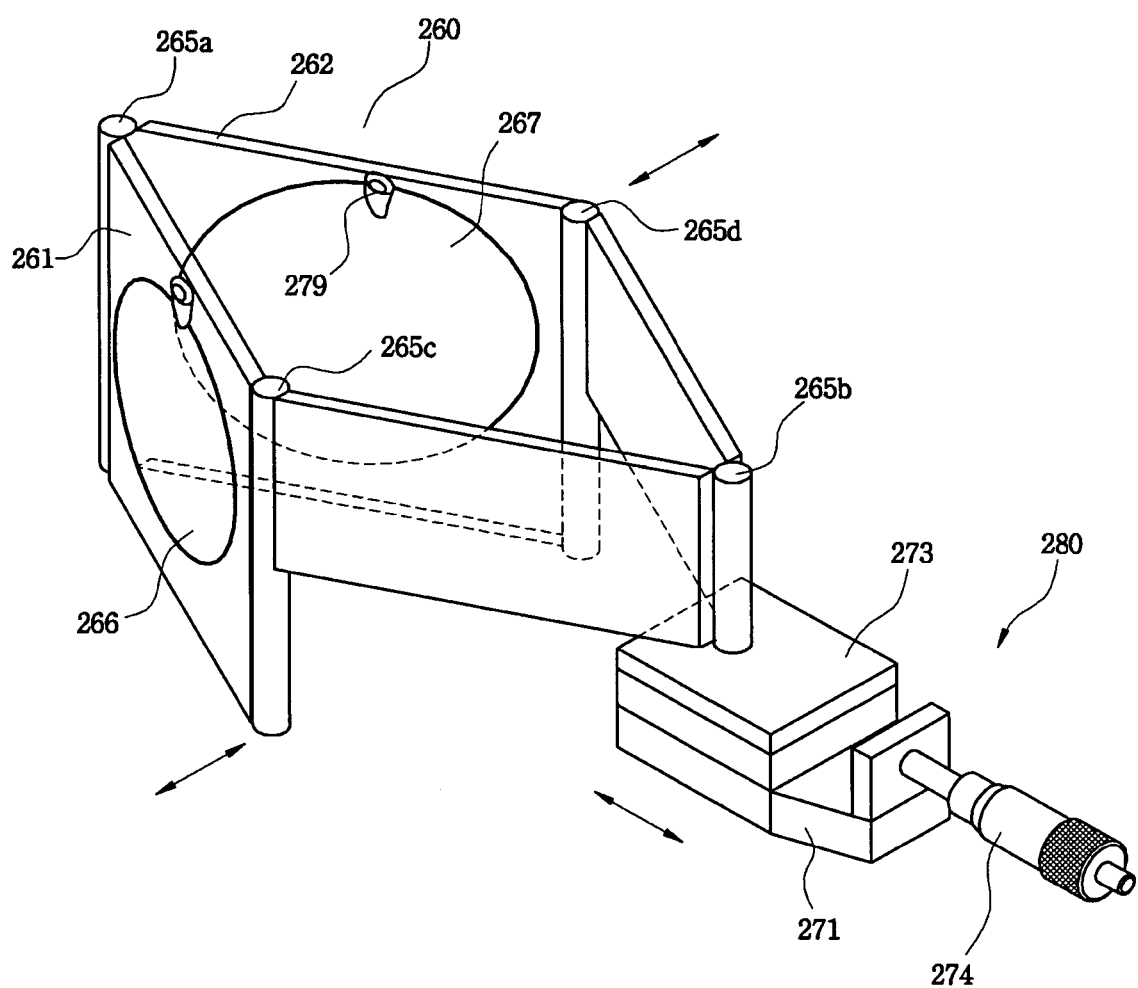

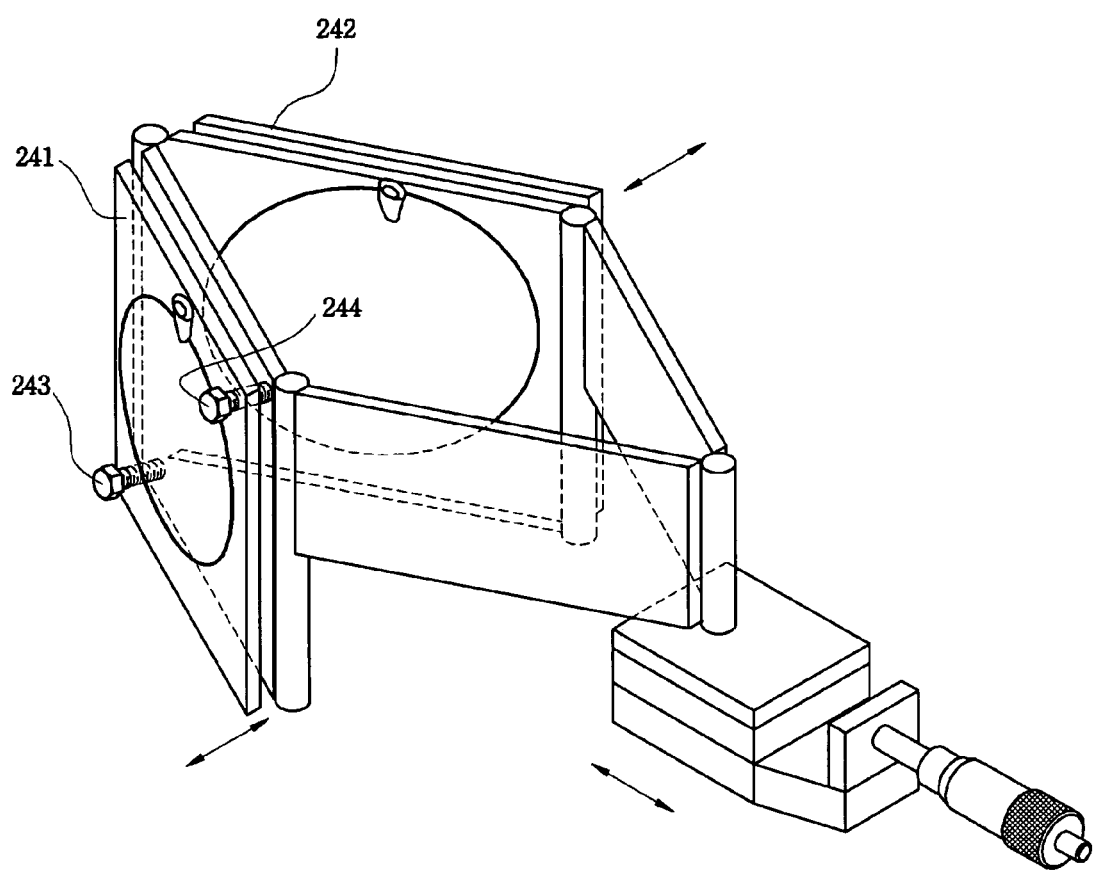
(FIG 5b)

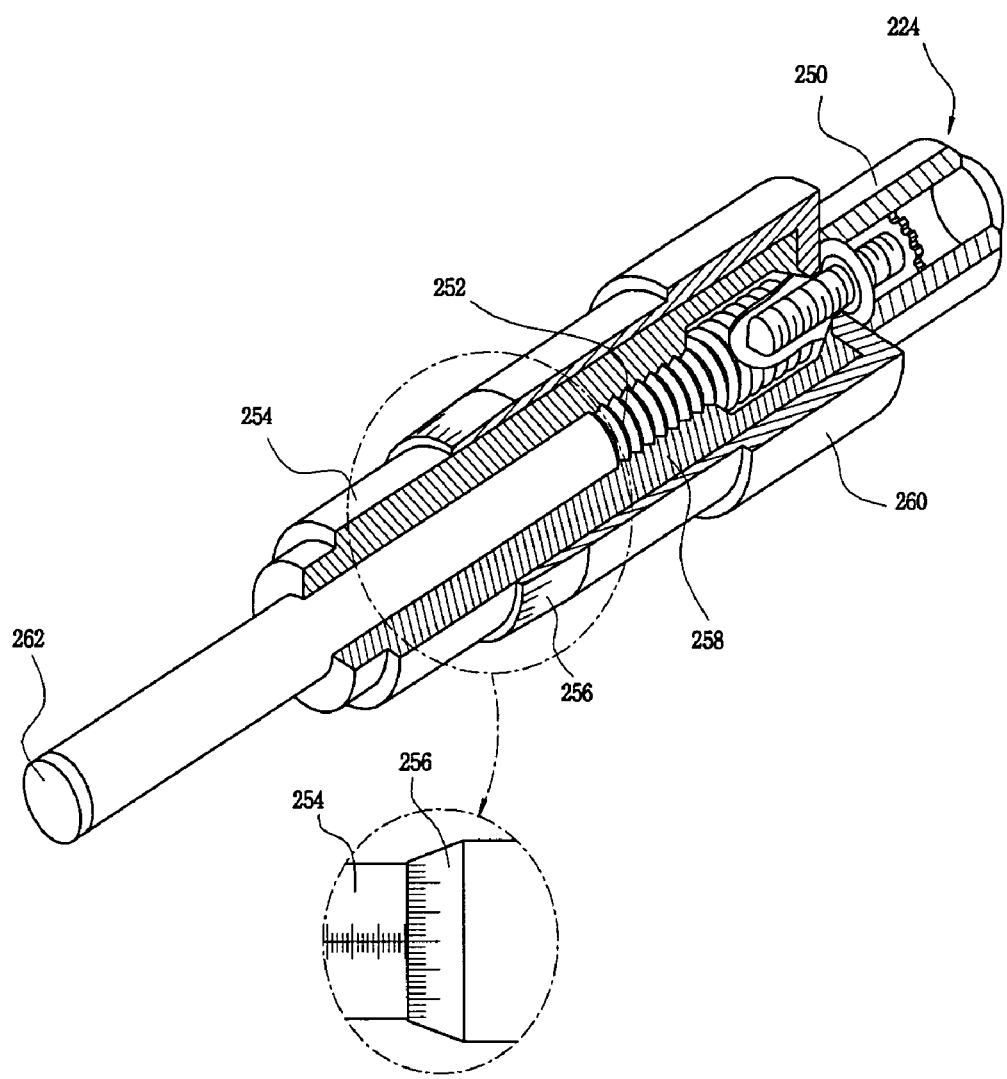
(FIG 6)

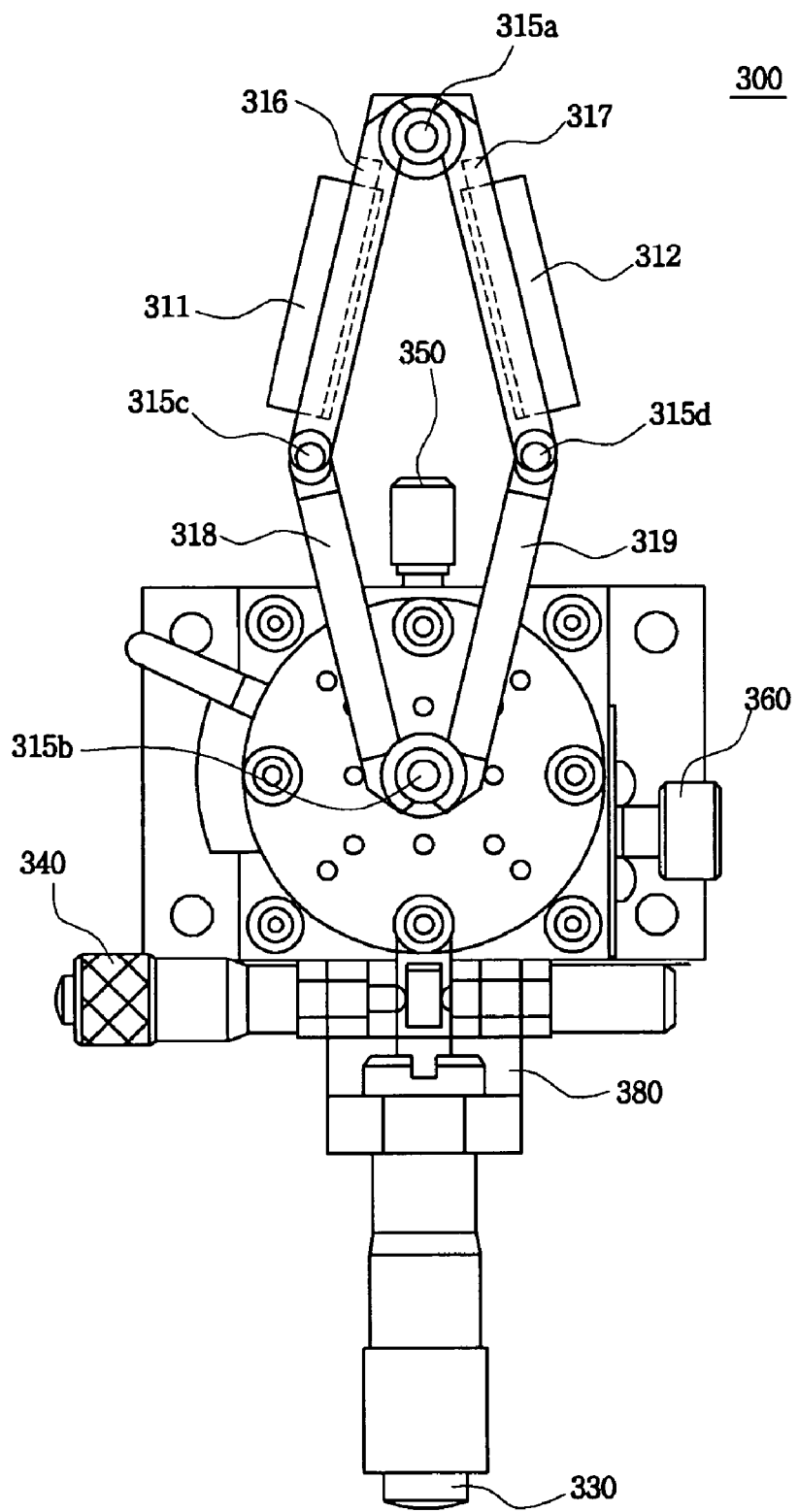
(FIG 7)

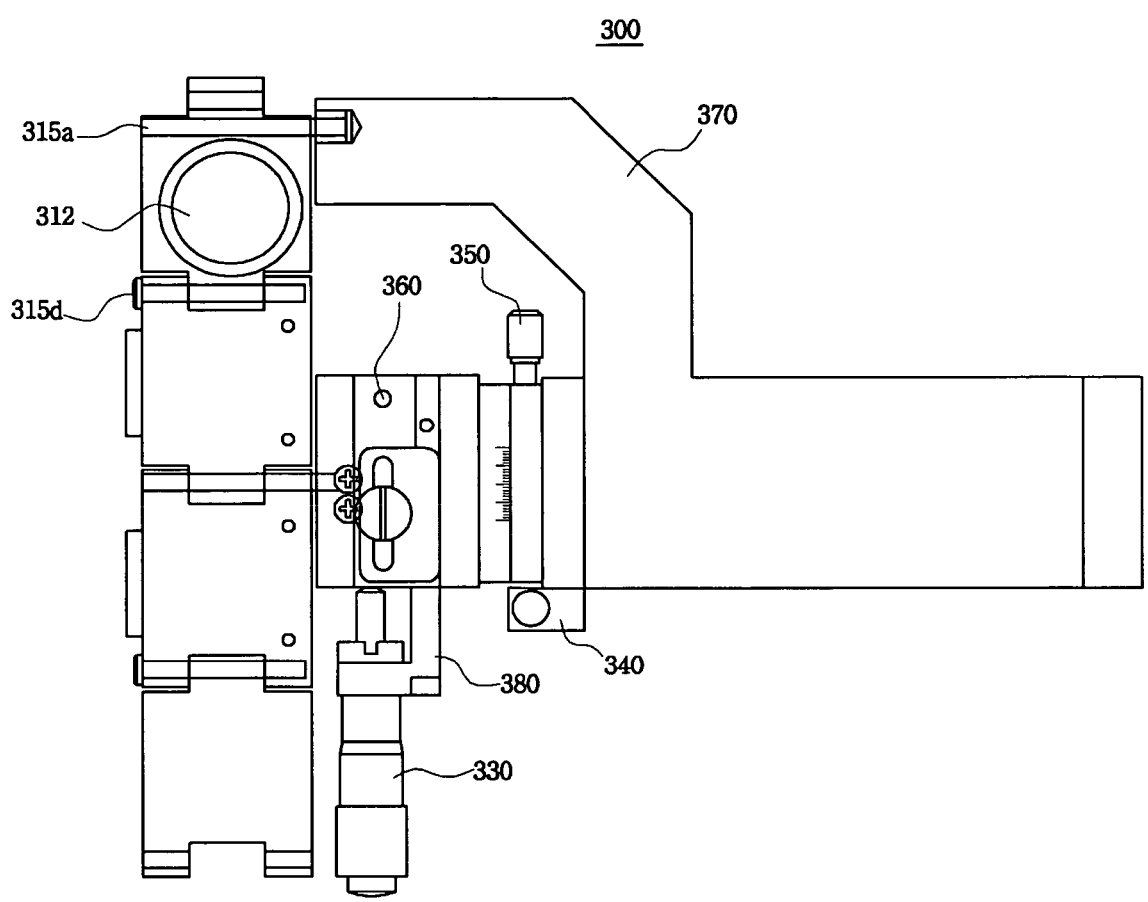

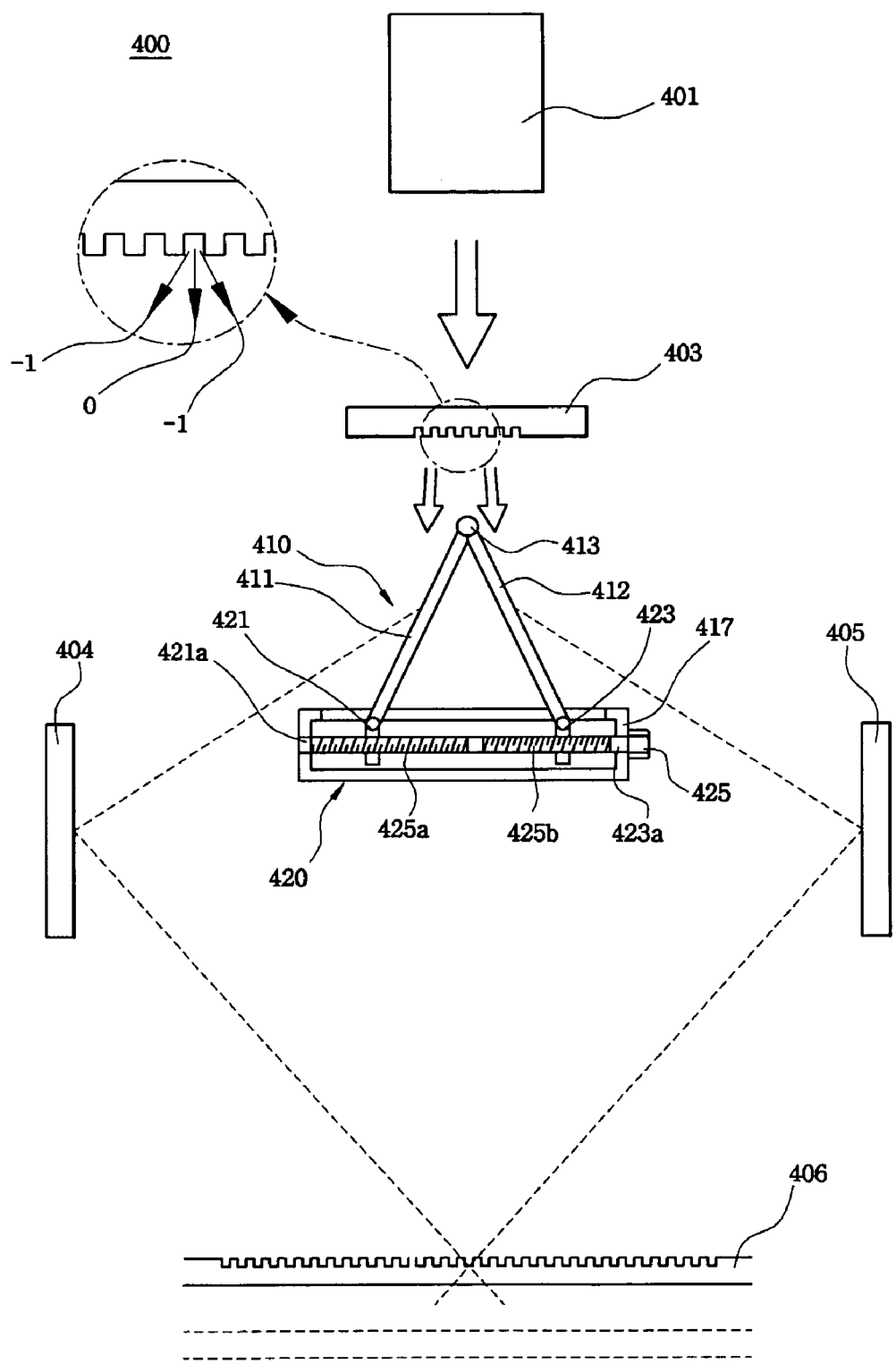
(FIG 9)

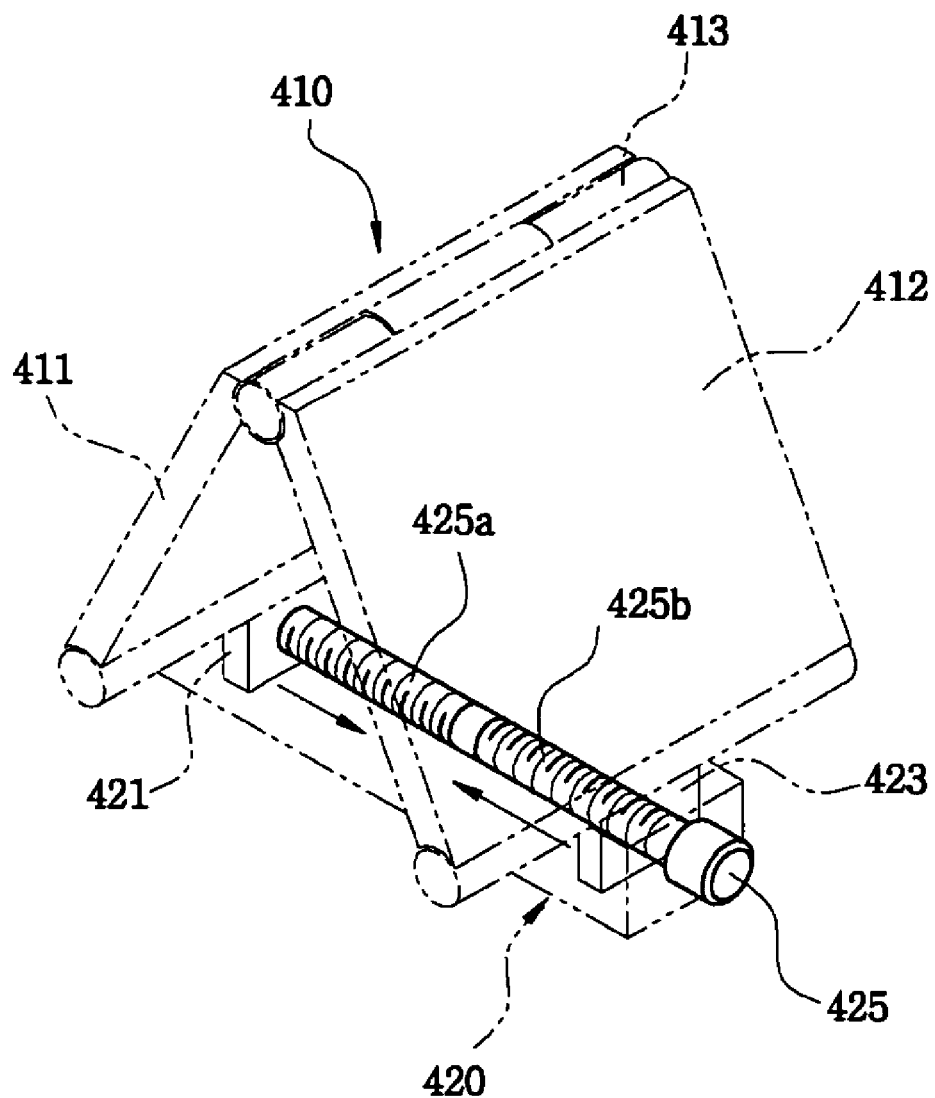

APPARATUS FOR WRITING BRAGG GRATINGS AND REFLECTION UNIT USED IN THE APPARATUS

CROSS-REFERENCE TO RELATED APPLICATION

This application claims the benefit of Korean Patent Application No. 2005-41842, filed on May 18, 2005, the disclosure of which is incorporated herein in its entirety by reference.

BACKGROUND OF THE INVENTION

1. Field of the Invention

The present invention relates to an apparatus for writing Bragg gratings, and more particularly, to an apparatus for writing Bragg gratings and a reflection unit used in the apparatus capable of readily adjusting an incident angle of light radiated from a light source, in order to write the Bragg gratings on an optical fiber, a planar waveguide, a polymer waveguide, or the like.

2. Description of the Related Art

Generally, an optical fiber grating for writing Bragg gratings on an optical fiber is an optical fiber device for periodically or non-periodically varying an index of refraction of an inner core of the optical fiber to reflect a certain wavelength of light or to generate transmission loss. The optical fiber grating is employed in various devices used in the field of optical communications, such as an optical add/drop multiplexer (OADM), a wavelength add/drop multiplexer (WADM), a dispersion compensator, a wavelength selection reflection mirror, a wavelength removing filter, a specific wavelength transmission filter, an optical laser, a mode converter, and a gain flattering filter of an erbium-added optical fiber amplifier.

A conventional apparatus for writing Bragg gratings will now be described. FIG. 1 is a view of a conventional apparatus for writing Bragg gratings.

Referring to FIG. 1, the conventional apparatus 100 for writing Bragg gratings includes a light source 101 for radiating light, a beam splitter 103 for converting a path of the light radiated from the light source 101, and first and second reflection mirrors 105 and 107 for reflecting the light whose path has been converted by the beam splitter 103 into an optical fiber 109.

The light radiated from the light source 101 is divided into a reference light beam 104a passing through the beam splitter 103, and a target light beam 104b reflected by the beam splitter 103. The target light beam 104b is reflected again toward the optical fiber 109 by the second reflection mirror 107, and the reference light beam 104a is reflected again toward the optical fiber 109 by the first reflection mirror 105.

Interference fringes are formed on the optical fiber 109 by the reference light beam 104a and the target light beam 104b reflected by the first and second reflection mirrors 105 and 107. In this process, a bright interference fringe-forming region increases an index of refraction since the light is absorbed through an optical fiber core, and a dark interference fringe-forming region does not alter the index of refraction since the light is not well absorbed.

Using this theory, Bragg gratings, in which the index of refraction of the optical fiber core periodically varies, are written. Meanwhile, in order to change the position of a target object such as the optical fiber 109 in which the Bragg gratings are written, or to adjust an interval between the gratings, an incident angle of light introduced into the target object 109 should be adjusted. For this purpose, the conventional apparatus 100 for writing Bragg gratings rotates the first and second reflection mirrors 105 and 107 to adjust a reflection angle of the light.

However, in order to adjust the reflection angle of the light, the first and second reflection mirrors 105 and 107 should be rotated according to the calculated result of the incident angle of the light beams 104a and 104b incident on the first and second reflection mirrors 105 and 107 and the reflection angle of the light reflected by the first and second reflection mirrors 105 and 107.

Therefore, whenever the position of the target object, such as the optical fiber 109, into which the Bragg gratings are written, changes, or the interval between the gratings is adjusted, it is difficult to readily adjust the incident angle of the light on the target object 109 since the first and second reflection mirrors 105 and 107 should be rotated by calculating the incident angle and the reflection angle of the light beams 104a and 104b.

SUMMARY OF THE INVENTION

In order to solve the foregoing and/or other problems, it is an aspect of the present invention to provide an apparatus for writing Bragg gratings and a reflection unit used in the same capable of readily adjusting an incident angle of light introduced into a target object into which Bragg gratings are written when the position of the target object changes or an interval between the Bragg gratings is adjusted.

Additional aspects and advantages of the present invention will be set forth in part in the description which follows and, in part, will be obvious from the description, or may be learned by practice of the invention.

The foregoing and/or other aspects of the present invention may be achieved by providing an apparatus for writing Bragg gratings, including: a light source for radiating light; a diffraction unit for diffracting the light radiated from the light source; a reflection unit including first to fourth connecting members hinged to each other in a rhombus-shape to vary a diagonal length using an adjustment bar, and first and second reflection mirrors respectively attached to the first and second connecting members to reflect the diffracted light, the reflection unit adjusting a reflection angle of the diffracted light by adjusting the diagonal length using the adjustment bar; and first and second stationary mirrors again reflecting the light reflected by the reflection unit toward a target object.

Preferably, the diffraction unit diffracts the light radiated from the light source into $0^{th}$ and $\pm 1^{st}$ order diffracted light and introduces the diffracted light into the reflection unit, the first reflection mirror reflects $+1^{st}$ order diffracted light to change a path of the light, and the second reflection mirror reflects $-1^{st}$ order diffracted light to change the path of the light.

Another aspect of the present invention may be achieved by providing a reflection unit used in an apparatus for writing Bragg gratings, the reflection unit including: first to fourth connecting members hinged to each other in a rhombus-shape by hinge means; and an angle adjusting unit fixed to a first hinge means for hinging the first and second connecting members at its one end, and reciprocally moving a second hinge means for hinging the third and fourth connecting members, wherein first and second reflection mirrors for reflecting each light that propagates along two paths are attachable to the first and second connecting members.

Still another aspect of the present invention may be achieved by providing a reflection unit used in an apparatus for writing Bragg gratings, the reflection unit including: first to fourth connecting members hinged to each other in a rhombus-shape to vary a diagonal length using an adjustment bar; and an angle adjusting unit for adjusting a reflection angle of incident light by adjusting the diagonal length using the adjustment bar, wherein first and second reflection mirrors for reflecting each light that propagates along two paths are attachable to the first and second connecting members.

Preferably, the light radiated from the light source is introduced into the reflection unit as $0^{th}$ and $±1^{st}$ order diffracted beams.

BRIEF DESCRIPTION OF THE DRAWINGS

The above and other aspects and advantages of the present invention will become more apparent from the following description of the invention and the accompanying drawings, in which:

FIG. 1 is a view of a conventional apparatus for writing Bragg gratings;

FIG. 2 is a view of an apparatus for writing Bragg gratings in accordance with an embodiment of the present invention;

FIGS. 3A and 3B are views illustrating operations of the apparatus for writing Bragg gratings shown in FIG. 2;

FIGS. 4, 5A and 5B are perspective views of a reflection unit for the apparatus for writing Bragg gratings shown in FIG. 2;

FIG. 6 is a perspective view of a micrometer which can be employed in the apparatus for writing Bragg gratings in accordance with an embodiment of the present invention;

FIGS. 7 and 8 are a plan view and a side view of the apparatus for writing Bragg gratings in accordance with an embodiment of the present invention;

FIG. 9 is a view of an apparatus for writing Bragg gratings in accordance with another embodiment of the present invention; and FIG. 10 is a perspective view of a reflection unit for the apparatus for writing Bragg gratings of FIG. 9.

DETAILED DESCRIPTION OF THE INVENTION

The present invention will now be described in detail with reference to preferred embodiments thereof shown in the accompanying drawings. Throughout the drawings, like reference numerals refer to like elements.

FIG. 2 is a view of an apparatus for writing Bragg gratings in accordance with an embodiment of the present invention. Referring to FIG. 2, the apparatus 200 for writing Bragg gratings in accordance with an embodiment of the present invention includes a light source 201, a diffraction unit 203, a reflection unit 210, and first and second stationary mirrors 204 and 205.

Generally, the light source 201 may be laser whose wavelength is adjusted to radiate UV light.

The diffraction unit 203 diffracts UV light radiated from the light source 201 into $0^{th}$, $+1^{st}$ and $-1^{st}$ order diffracted light and introduces the diffracted light into the reflection unit 210. The diffraction unit 203 may use a phase mask. Preferably, the phase mask 203 makes the efficiency of the $0^{th}$ order diffraction lower so that the $0^{th}$ order diffracted light does not affect writing of Bragg gratings. Therefore, a phase difference of the light passing through valleys and ridges of the phase mask 203 is adjusted to lower the $0^{th}$ order diffraction efficiency.

The reflection unit 210 includes four hinge means 215a to 215d, first to fourth connecting members 211 to 214, first and second reflection mirrors 216 and 217, and an angle adjusting unit 220. The first to fourth connecting members 211 to 214 are hinged to each other at their ends by the four hinge means 215a to 215d in the shape of a rhombus. The first reflection mirror 216 is attached to the first connecting member 211 to reflect $+1^{st}$ order diffracted light 202a and change its path. The second reflection mirror 217 is attached to the second connecting member 212 to reflect $-1^{st}$ order diffracted light 202b and change its path. Meanwhile, the angle adjusting unit 220 includes a support frame 221, a slider 223, and an adjustment bar 224. The support frame 221 includes a guide 222 formed in one direction at its center part, and is fixed to the first hinge means at its one end. Preferably, the first hinge means 215a is installed along the path of the $0^{th}$ order diffracted light, such that the $0^{th}$ order diffracted light introduced through the phase mask 203 cannot arrive at the reflection mirrors 216 and 217. Preferably, the first hinge means 215a is fixed to the guide 222.

The slider 223 can reciprocate along the guide 222, and the second hinge means 215b is fixed to the slider 223. The adjustment bar 224 controls movement of the slider 223. In this process, the adjustment bar 224 is fixed to the support frame 221, and a screw that increases or decreases in length in one direction from the adjustment bar 224 depending on a rotational direction of the adjustment bar 224 is connected to the slider 223, so that the slider 223 can be moved by the rotational movement of the adjustment bar 224. Meanwhile, the slider 223 may be manufactured in various shapes as long as it includes a hinge means.

The reflection unit 210 may have any constitution including the above-mentioned structure. When the slider 223 is moved in one direction by the adjustment bar 224, an interval between the third and fourth hinge means 215c and 215d grows wider, which increases a hinge angle E) between the first and second reflection mirrors 216 and 217. When the slider 223 is moved in the opposite direction by the adjustment bar 224, an interval between the third and fourth hinge means 215c and 215d gets narrower, which decreases the hinge angle Θ between the first and second reflection mirrors 216 and 217.

The first stationary mirror 204 re-reflects the $1^{st}$ order diffracted light 202a reflected from the first reflection mirror 216 toward the target object 206. The second stationary mirror 205 re-reflects the $-1^{st}$ order diffracted light 202b reflected from the second reflection mirror 217 toward the target object 206. Bragg gratings are formed at the target object 206 by the light 202a and 202b introduced by the first and second stationary mirrors 204 and 205.

FIGS. 3A and 3B are views illustrating operations of the apparatus for writing Bragg gratings shown in FIG. 2. As shown in FIG. 3A, when the adjustment bar 224 is rotated in one direction to move the slider 223, an interval between the third and fourth hinge means 215c and 215d grows wider, causing the hinge angle Θ between the first and second reflection mirrors 216 and 217 to increase.

Referring to FIG. 3B, when the adjustment bar 224 is rotated in the opposite direction to move the slider 223, an interval between the third and fourth hinge means 215c and 215d gets narrower, causing the hinge angle Θ between the first and second reflection mirrors 216 and 217 to decrease. As described above, it is possible to readily adjust the interval between Bragg gratings by adjusting the hinge angle Θ between the first and second reflection mirrors 216 and 217 using the angle adjusting unit 220. In addition, it is also possible to readily adjust the incident angle of light introduced into the target object 206, even when the position of the target object 206 changes.

Furthermore, since the smaller the pitch of the phase mask 203, the larger the dihedral angle of the ±1$^{st}$ order diffracted light, when the apparatus for writing Bragg gratings uses a phase mask 203 having a large pitch, it is possible to make an interference effect by further narrowing the interval between the phase mask 203 and the target object 206.

A reflection unit for the apparatus for writing Bragg gratings will now be more specifically described. FIGS. 4, 5A, and 5B are perspective views of a reflection unit for the apparatus for writing Bragg gratings shown in FIG. 2.

Referring to FIG. 4, the reflection unit 210 includes the four hinge means 215a to 215d, the first to fourth connecting members 211 to 214, first and second reflection mirrors 216 and 217, and the angle adjusting unit 220. The support frame 221 is provided with a rail for moving the slider 223 fixed to the fourth hinge means 215d using a micrometer 224. Therefore, when the fourth hinge means 215d is moved by the micrometer 224 in an arrow direction, since the first hinge means 215a is stationary, an interval between the third and fourth hinge means 215c and 215d is adjusted.

Meanwhile, the reflection mirrors 216 and 217 may be disposed between the first and third hinge means 215a and 215c, and between the first and fourth hinge means 215a and 215d, by stationary means 229.

FIGS. 5A and 5B are perspective views of another reflection unit for the apparatus for writing Bragg gratings shown in FIG. 2.

Referring to FIG. 5A, the reflection unit 260 includes four hinge means 265a to 265d, first to fourth connecting members 261 to 264, first and second reflection mirrors 266 and 267, and an angle adjusting unit 280. A slider 273 is movably installed on a support frame 271. The slider 273 fixed to the fourth hinge means 265d is movable by a micrometer 274. Therefore, when the fourth hinge means 265d is reciprocally moved by the micrometer 274 in an arrow direction, since the first hinge means 265a is stationary, an interval between the third and fourth hinge means 265c and 265d is adjusted.

While FIG. 5 shows that one micrometer is installed to be movable in only one direction, it is obvious that at least two micrometers can be installed to be movable in at least two directions.

Meanwhile, FIG. 5B shows a modified example of the reflection unit of FIG. 5A. The difference from FIG. 5A is that adjustment plates 241 and 242 are additionally installed at the connecting members in order to precisely adjust an angle of the first and second reflection mirrors 266 and 267. In this case, the reflection mirrors can be precisely adjusted using precision adjustment screws 243 and 244.

FIG. 6 is a perspective view of a micrometer that can be employed in the apparatus for writing Bragg gratings in accordance with an embodiment of the present invention. For example, a sleeve 254 is fixed to the support frame (221 in FIG. 2), and an end of a spindle 262 is fixed to the slider (223 in FIG. 2). In this state, when a latch stop 250 is rotated, the spindle 252 is moved in the same direction as the guide (222 in FIG. 2) to move the slider (223 in FIG. 2). Here, a thimble 260 has a scale to enable more precise control of the movement of the slider 223 (see FIG. 2).

FIGS. 7 and 8 are a plan view and a side view of the apparatus for writing Bragg gratings in accordance with an embodiment of the present invention.

Referring to FIGS. 7 and 8, a reflection unit 300 includes four hinge means 315a to 315d, first to fourth connecting members 316 to 319, and angle adjusting units 330, 340, 350, 360, and 380. First and second reflection mirrors 311 and 312 can be fixed to the reflection unit 300.

While the first hinge means 315a and the angle adjusting units 330, 340, 350, 360, and 380 are fixed together to a base 370, upper parts 330, 360, and 380 of them can be moved in each direction.

Another embodiment of the present invention will now be described in conjunction with FIGS. 9 and 10.

FIG. 9 is a view of an apparatus for writing Bragg gratings in accordance with another embodiment of the present invention, and FIG. 10 is a perspective view of a reflection unit for the apparatus for writing Bragg gratings of FIG. 9.

Referring to FIGS. 9 and 10, the apparatus 400 for writing Bragg gratings in accordance with an embodiment of the present invention includes a light source 401, a diffraction unit 403, a reflection unit 410, and first and second stationary mirrors 404 and 405.

The light source 401 is generally a laser whose wavelength is adjusted to radiate UV light.

The diffraction unit 403 diffracts UV light radiated from the light source 401 into $0^{th}$ and ±1$^{st}$ order diffracted light and introduces the diffracted light into the reflection unit 410. In this process, the diffraction unit 403 may use a phase mask.

Preferably, the phase mask 403 makes the efficiency of $0^{th}$ order diffraction lower so that the $0^{th}$ order diffracted light does not affect writing of Bragg gratings. Therefore, a phase difference of the light passing through valleys and ridges of the phase mask 403 is adjusted to lower the $0^{th}$ order diffraction efficiency.

The reflection unit 410 functions to change a path of the ±1$^{st}$ order diffracted light using the phase mask 403, and includes first and second reflection mirrors 411 and 412, hinge means 413, and an angle adjusting unit 420. The first reflection mirror 411 reflects to change a path of the +1$^{st}$ order diffracted light, and the second reflection mirror 412 reflects to change a path of the −1$^{st}$ order diffracted light. Meanwhile, the hinge means 413 is installed on upper sides of the first and second reflection mirrors 411 and 412 to rotatably couple the reflection mirrors 411 and 412. Just as a hinge angle is adjusted by the hinge means 413, it is possible to adjust an angle of incidence on a target object 406, depending on when the position of the target object is changed, and it is also possible to adjust an interval between Bragg gratings.

In addition, a phase difference of the light passing through valleys and ridges of the phase mask 403 may be adjusted to lower the efficiency of $0^{th}$ order diffraction which affects writing of Bragg gratings. Therefore, the hinge means 413 preferably has a function of preventing $0^{th}$ order diffracted light from arriving at the first and second reflection mirrors 411 and 412.

The angle adjusting unit 420 functions to adjust a hinge angle between the first and second reflection mirrors 411 and 412 as described above, and includes first and second frames 421 and 423, and a lead screw 425.

The first and second frames 421 and 423 are formed at lower sides of the first and second reflection mirrors 411 and 412, respectively, a first female thread 421a is formed to pass through the first frame 421 in a lateral direction of the first reflection mirror 411, and a second female thread 423a is formed to pass through the second frame 423 in a lateral direction of the second reflection mirror 412.

The lead screw 425 has first and second male threads 425a and 425b on an outer circumferential surface so as to be engaged with the first and second female threads 421a and 423a. The first male thread 425a has a thread direction opposite to the second male thread 425b. In this process, the first female thread 421a has a thread direction formed corresponding to the first male thread 425a, and the second female thread 423a has a thread direction formed corresponding to the second male thread 425b.

In addition, the angle adjusting unit 420 preferably further includes a support frame 417 for fixedly supporting the lead screw 425 such that the lead screw 425 remains stationary and only the first and second frames 421 and 423 can be moved when the lead screw 425 is rotated.

An operation of the angle adjusting unit 420 of the reflection unit will now be described in conjunction with FIG. 10.

When the lead screw 425 is rotated, the first and second male threads 425a and 425b formed on its outer circumferential surface rotate to move the first and second frames 421 and 423 having the first and second female threads 421a and 423a engaged with the first and second male threads 425a and 425b. Here, since the first and second male threads 425a and 425b have different thread directions, the first and second frames 421 and 423 are moved together outward or inward with respect to the lead screw 425.

A hinge angle between the first and second reflection mirrors 411 and 412 is adjusted by the first and the second frames 421 and 423 moved as described above. When the lead screw 425 is rotated in one direction, the first frame 421 is moved leftward and the second frame 423 is moved rightward, thereby increasing the hinge angle. In addition, when the lead screw 425 is rotated in the opposite direction, the first frame 421 is moved rightward and the second frame 423 is moved leftward, thereby decreasing the hinge angle.

As described above, the interval between the Bragg gratings can be readily adjusted by adjusting the hinge angle between the first and second reflection mirrors 411 and 412 using the angle adjusting unit 420. In addition, the incident angle of light finally introduced into the target object 406 can be readily adjusted even when the position of the target object 406 changes.

Meanwhile, the first and second stationary mirrors 404 and 405 are fixed to a frame (not shown) of the apparatus for writing Bragg gratings. The light reflected by the first reflection mirror 411 is reflected again by the first stationary mirror 404, and the light reflected by the second reflection mirror 412 is reflected again by the second stationary mirror 405, thereby finally writing the Bragg gratings on the target object 406.

In the present invention, it is unnecessary to install the first and second stationary mirrors 404 and 405 in a rotational manner like in the conventional apparatus for writing Bragg gratings. Thus, it is possible to reduce overall manufacturing cost.

As can be seen from the foregoing, the present invention is capable of readily adjusting the incident angle of light introduced into the target object by only rotating the adjustment bar or the lead screw.

In addition, it is possible to further reduce manufacturing cost of the apparatus for writing Bragg gratings since mirrors of the apparatus for writing Bragg gratings do not have to be installed in a rotational manner.

While exemplary embodiments of the present invention have been shown and described, it will be appreciated by those skilled in the art that various changes and modifications can be made to the described embodiments without departing from the spirit and scope of the invention as defined by the appended claims and their equivalents.

What is claimed is:

1. An apparatus for writing Bragg gratings, comprising:
   a light source for radiating light;
   a diffraction unit for diffracting the light radiated from the light source;
   a reflection unit including first to fourth connecting members hinged to each other in a rhombus-shape to vary a diagonal length using an adjustment bar, and first and second reflection mirrors respectively attached to the first and second connecting members to reflect the diffracted light, the reflection unit adjusting a reflection angle of the diffracted light by adjusting the diagonal length using the adjustment bar; and
   first and second stationary mirrors again reflecting the light reflected by the reflection unit toward a target object.

2. The apparatus according to claim 1, wherein the diffraction unit diffracts the light radiated from the light source into $0^{th}$ and $\pm 1^{st}$ order diffracted light and introduces the diffracted light into the reflection unit.

3. The apparatus according to claim 2, wherein the first reflection mirror reflects $+1^{st}$ order diffracted light to change a path of the light and the second reflection mirror reflects $-1^{st}$ order diffracted light to change the path of the light.

4. The apparatus according to claim 1, wherein the diffraction unit is a phase mask.

5. The apparatus according to claim 1, wherein the adjustment bar is a micrometer.

6. A reflection unit used in an apparatus for writing Bragg gratings, the reflection unit comprising:
   first to fourth connecting members hinged to each other in a rhombus-shape by hinge means; and
   an angle adjusting unit fixed to a first hinge means for hinging the first and second connecting members at its one end, and reciprocally moving a second hinge means for hinging the third and fourth connecting members,
   wherein first and second reflection mirrors for reflecting each light that propagates along two paths are attachable to the first and second connecting members.

7. The reflection unit according to claim 6, wherein the angle adjusting unit adjusts a hinge angle between the first and second reflection mirrors.

8. A reflection unit used in an apparatus for writing Bragg gratings, the reflection unit comprising:
   first to fourth connecting members hinged to each other in a rhombus-shape to vary a diagonal length using an adjustment bar; and
   an angle adjusting unit for adjusting a reflection angle of incident light by adjusting the diagonal length using the adjustment bar,
   wherein first and second reflection mirrors for reflecting each light that propagates along two paths are attachable to the first and second connecting members.

9. The reflection unit according to claim 6, wherein light radiated from a light source is introduced into the reflection unit as $0^{th}$ and $\pm 1^{st}$ order diffracted beams.

10. The reflection unit according to claim 7, wherein light radiated from a light source is introduced into the reflection unit as $0^{th}$ and $\pm 1^{st}$ order diffracted beams.

11. The reflection unit according to claim 8, wherein light radiated from a light source is introduced into the reflection unit as $0^{th}$ and $\pm 1^{st}$ order diffracted beams.

* * * * *

UNITED STATES PATENT AND TRADEMARK OFFICE
CERTIFICATE OF CORRECTION

| | | |
|---|---|---|
| PATENT NO. | : 7,269,315 B2 | Page 1 of 1 |
| APPLICATION NO. | : 11/200187 | |
| DATED | : September 11, 2007 | |
| INVENTOR(S) | : Jun Mo Han | |

It is certified that error appears in the above-identified patent and that said Letters Patent is hereby corrected as shown below:

At column 8, line 14 of the printed patent, "angle of the diffracted tight" should be -- angle of the diffracted light --

At column 8, line 26 of the printed patent, "-1$^{st}$ order diffracted tight" should be -- -1$^{st}$ order diffracted light --

Signed and Sealed this

Thirteenth Day of May, 2008

JON W. DUDAS
*Director of the United States Patent and Trademark Office*